United States Patent [19]

Karlsson

[11] 4,209,141

[45] Jun. 24, 1980

[54] CENTRIFUGAL BRAKE IN MULTIPLIER FISHING REELS

[75] Inventor: Jarding U. Karlsson, Svängsta, Sweden

[73] Assignee: ABU Aktiebolag, Sweden

[21] Appl. No.: 961,906

[22] Filed: Nov. 20, 1978

[30] Foreign Application Priority Data

Nov. 28, 1977 [SE] Sweden ............................... 7713421

[51] Int. Cl.² ............................................. A01K 89/02
[52] U.S. Cl. .............................. 242/84.52 C; 188/185
[58] Field of Search ................. 242/84.52 C; 188/185, 188/186, 187

[56] References Cited

U.S. PATENT DOCUMENTS

| 3,717,954 | 2/1973 | Sheckells | 188/185 |
| 3,812,940 | 5/1974 | Svensson | 242/84.52 C |
| 3,986,678 | 10/1976 | Coquelet et al. | 188/185 |

*Primary Examiner*—Billy S. Taylor
*Attorney, Agent, or Firm*—Karl W. Flocks

[57] ABSTRACT

The invention relates to fishing reels of the type having a line spool which is rotatable at high velocity by drag force from the line spool during casting, and in which the line spool supports a centrifugally actuable brake device which comprises a plurality of pins projecting radially from a part, fixed to the line spool, and brake members slidably mounted on the pins for braking cooperation at radial outer positions thereof with a circumferential stationary surface. The centrifugally actuable members are in the form of sleeves and the pins have heads at their radial outer ends, the inner end portion of each sleeve having an opening of reduced diameter and being elastically resilient to permit the insertion of the pin head into the sleeve by the exercising of substantial force, whereupon the sleeve is radially outwardly slidable on its associated pin to a position in which the pin head is in contact with the shoulder at the reduced inner diameter of the sleeve opening, whereby each sleeve is prevented from being unintentionally separated from the pin.

4 Claims, 3 Drawing Figures

CENTRIFUGAL BRAKE IN MULTIPLIER FISHING REELS

The present invention relates to a centrifugal brake in a fishing reel of the multiplier type.

It is known in this art to equip multiplier reels with centrifugal brakes whose task is to brake the line spool during a cast in order to prevent the spool from rotating at too high a speed in relation to the pay-out velocity of the line. When the bait is cast out, the speed of flight of the bait fades with increasing distance from the fishing rod and reel, whereas the line spool, which is journalled for as friction-free rotation as possible, continues to pay out at high speed. When the pay-out speed of the line falls off, the drag of the line on the multiplier is reduced and, in unfortunate cases, the speed of rotation of the spool can exceed the pay-out velocity of the line, in which event so-called overrun on the spool can occur. Such overrun depends on the fact that the inner line turns on the spool rotate at the same speed as the line spool, whereas the outer turns on the spool do not follow with the same speed. As a result, the outer turns of the line will be shifted radially outwardly by the inner line turns, at the same time as the entire line charge will become loose on the spool. It may even happen that the spool rotates at such high speed in relation to the line being paid out that the line is caught up by the spool or its outer line turns and will suddenly be wound up on the spool in the opposite direction. The result will be a birdsnest which may be difficult to unravel, and after such an overrun, it may be necessary to replace the entire line.

The object of the centrifugal brake is to prevent such occurrences by braking the line spool.

A considerable problem in prior-art centrifugal brakes is that the brake weights (centrifugal weights) which are shiftably mounted on brake weight pins may easily be dropped or lost in the assembly and dismantling of the reel.

The major aspect of the present invention is to produce a centrifugal brake with brake weights which cannot be lost.

To this end, each brake weight is in the form of a sleeve which has an open cavity at the radial outer end of the sleeve and a bottom at the radial inner end with an opening which is constricted in relation to the cavity. Moreover, the brake weight pin which extends into the sleeve through the bottom opening of the sleeve has, at its radial outer end, a head. Finally, the bottom opening and cavity of the sleeve are dimensioned in relation to the brake weight pin and its head such that the sleeve is freely shiftable to a radially outer end position in which the bottom of the sleeve and the head of the brake weight pin together form cooperating abutments.

The nature of the present invention and its aspects will be more readily understood from the following brief description of the accompanying drawings, and discussion relating thereto.

Figure 1:
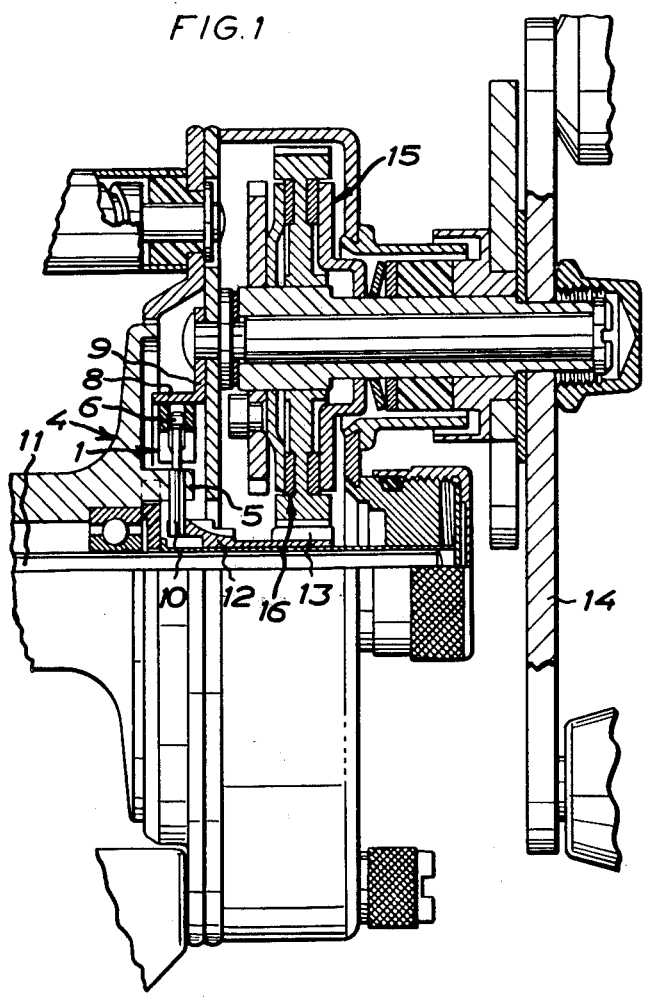
FIG. 1 is partly a side elevation and partly an axial section of an end portion of a multiplier with a centrifugal brake according to the invention.
Figure 2:
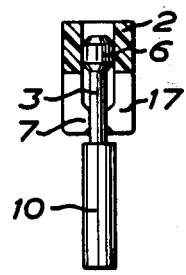
FIG. 2 shows, on a larger scale, a brake weight according to the invention mounted on a brake weight pin.
Figure 3:
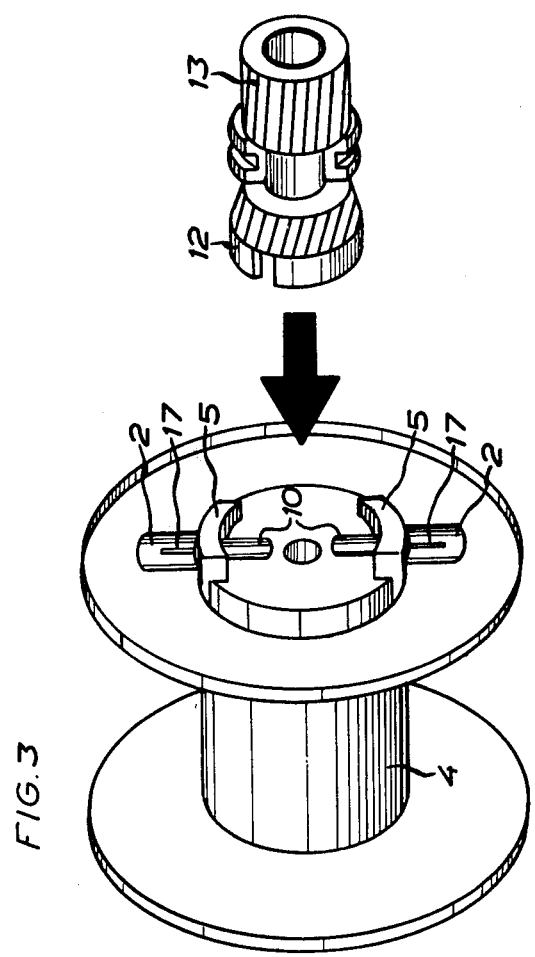
FIG. 3 shows the line spool and a clutch device in perspective.

The multiplier shown in FIG. 1 is equipped with a centrifugal brake, generally designated 1, including a number, for example two, of brake weights 2 which are shiftably mounted on brake weight pins 3. Each brake weight pin 3 is fixedly retained at its radially inner end portion in an axial projection 5, located adjacent the hub of the line spool 4, from the right-hand end of the line spool with respect to FIG. 1. The outer end portion of each brake weight pin 3 is in the form of a pin with a head 6 at the outer end, and each brake weight 2 is in the form of a sleeve whose cavity is open at the outer end and which, at its inner end, has a bottom 7 with a radius in relation to the elasticity of the sleeve and the head 6 of the brake weight pin 3 such that the head 6 on each respective brake weight pin 3 may pass through the opening in the bottom of the sleeve by the exercising of pressure radially inwardly against the sleeve. The bottom wall 7 permits such pressure by elastic deformation and then resiliently returns to the position shown on the drawings, whereby the brake weight sleeve 2 is retained on the brake weight pin 3.

The brake weight sleeve 2 is guided on the brake weight pin 3 at two points, namely (a) in the region of the opening in the bottom wall 7, and (b) in the region of the head 6 of the brake weight pin. Sliding friction between the mutually guided surfaces is, however, slight and the brake weight can, therefore, easily be shifted on its brake weight pin which may consist of metal.

The brake weights may be shifted radially on the brake weight pins into abutment against a cylindrical braking surface which consists of the inner circumferential surface of an annular flange 8 at the inner circumference of an annular plate 9 which is fixedly retained on the inside of a frame wall 9.

In the illustrated embodiment, radial inner extensions of the brake weight pins form clutch elements 10 for cooperation with a clutch member 12 shiftably disposed on the shaft 11 of the line spool and being of a known design which will, for that reason, not be described in greater detail. It might, however, be mentioned that the clutch member 12 forms an extension of a gear wheel 13 which is driven by the crank 14 by the intermediary of a transmission for operation of the line spool 4. The gear wheel 13 with the clutch member 12 may, by means of an operating device (not shown) be shifted in a direction to the right from the position shown on the drawing, out of engagement with the radial inner extensions of the brake weight pins, such that the line spool is thereby released from the crank and the transmission connected thereto, which is generally designated 15 and comprises a sliding clutch 16.

When the multiplier is dismantled, the brake weight pins 3 are retained on the line spool and the brake weights 2 are retained on the brake weight pins since they cannot be shifted radially outwardly past the heads 6 of the brake weight pins without the exercising of an intentional and considerable force. However, the brake weights may be replaced, if desired, but the replacement of brake weights need never take place unnecessarily, that is to say as the result of the loss of a brake weight or weights during the assembly or dismantling operation, and, more important, the user need never meet with the not uncommon ill-luck that brake weights are lost when, for some reason during a fishing trip, the user temporarily dismantles the reel for purposes of repair or the like, and does not have access to reserve brake weights.

In order to facilitate assembly and dismantling of the sleeve-shaped brake weights according to the invention, these are preferably provided with one or more longitudinal slots in the bottom portion of the sleeves, as shown at 17. The presence of these slots increases the elasticity of the bottom portions of the sleeves, whereby the penetration of the heads 6 of the brake weight pins 3 into the sleeves is facilitated and, naturally, also withdrawal of the heads through the holes in the bottoms of the sleeves when the unit is to be dismantled.

While brake weights of acetate plastics and brake weight pins of steel are to be preferred, other suitable materials can, naturally, be used.

Furthermore, the brake weight pins 3 may be connected to the line spool 4 in another manner than that shown, and their radial inner end portions need not be extended so as to form clutch members for the line spool 4 with respect to the transmission driven by the crank. Nevertheless, the illustrated embodiment combines two functions in a very simple and practical manner.

What I claim and desire to secure by Letters Patent is:

1. A centrifugal brake device on a multiplier reel comprising
    a plurality of brake weight pins mounted in a radially outwardly directed direction, each said pin having a head at its radially outer end;
    a brake weight in the form of a sleeve shiftably mounted on each said brake weight pin, each said sleeve having an open ended cavity at the radially outer end of the sleeve, and a bottom portion with an opening constructed in relation to said cavity at its radially inner end with at least said bottom portion being resiliently deformable sufficiently to allow said head of said pin to be forced into said sleeve through said opening in said bottom portion and said bottom portion return to its initial position whereby said brake weight sleeve may thereafter be removed from said brake weight pin only by exercise of a considerable force,
    said bottom opening and said cavity in said sleeve being so dimensioned in relation to said brake weight pin and its said head that said sleeve is freely shiftable to a radially outer end position in which said bottom portion of said sleeve and said head of said pin form mutually cooperating abutments.

2. The centrifugal brake device of claim 1, further characterized by
    a line spool and a transmission on said multiplier reel,
    a clutch member connected to said transmission,
    a radially inwardly directed extension on at least one of said plurality of brake weight pins forming a clutch element between said clutch member and said line spool.

3. The centrifugal brake device of claim 2, further characterized by
    a fishing reel crank on said multiplier reel driving said transmission.

4. The centrifugal brake device of claim 1, further characterized by
    each of said brake weight sleeves having resilience-increasing slots at its said bottom portion.

* * * * *